United States Patent [19]
Yabuta

[11] 4,289,329
[45] Sep. 15, 1981

[54] SEAT BELT SYSTEM
[75] Inventor: Keiichiro Yabuta, Yokohama, Japan
[73] Assignee: Nissan Motor Company, Limited, Yokohama, Japan
[21] Appl. No.: 42,371
[22] Filed: May 24, 1979
[30] Foreign Application Priority Data
 May 27, 1978 [JP] Japan ............................ 53-63748
[51] Int. Cl.³ .......................................... B60R 21/10
[52] U.S. Cl. ................................... 280/804; 297/469
[58] Field of Search ............... 280/802, 803, 804, 808; 297/469; 312/24, 25, 272, 117; 49/70

[56] References Cited
U.S. PATENT DOCUMENTS
1,718,374 6/1929 Oberst ................................. 312/25
3,850,446 11/1974 Hogensen ........................... 280/802
4,186,942 2/1980 Patel ................................... 280/804

FOREIGN PATENT DOCUMENTS
2649465 5/1978 Fed. Rep. of Germany ...... 280/804

Primary Examiner—John P. Silverstrim
Attorney, Agent, or Firm—Schwartz, Jeffery, Schwaab, Mack, Blumenthal & Koch

[57] ABSTRACT

A seat belt system includes a control arm with one end pivoted to an upper sash of a door and with the other end portion mounted to a roof side of a vehicle body for slidable movement. A seat belt extends from an anchor mounted to the roof side to a retractor mounted to the roof of the vehicle body adjacent the inboard side of a seat. A portion of the seat belt passes through the other end portion of the control arm. A spring is mounted so that when the door is closed, the other end portion of the control arm is urged to displace rearwardly till the control arm extends along the roof side to allow the seat belt to fasten around a passenger on the seat. As the door is opened, opening movement of the door will pull the one end of the control arm outwardly of the vehicle body, thus displacing the other end portion forwardly to extend the seat belt forwardly of the passenger for easy ingress or egress.

4 Claims, 9 Drawing Figures

SEAT BELT SYSTEM

BACKGROUND OF THE INVENTION

The present invention relates to a seat belt system for an automobile and more particularly to a mechanically actuated passive seat belt system.

Considerable number of vehicle passengers do not wear a seat belt, knowing the seat belt is effective in protecting the passenger during a crash of an automobile. This is because the passenger thinks it much trouble to wear the seat belt or disregards it.

For the purpose of eliminating the above-mentioned shortcoming, passive seat belt systems have been developed which are designed to automatically fasten a seat belt around a passenger in a seat when a vehicle door is closed.

Among these systems of the passive type a group of systems is known wherein a seat belt is fixed at one end thereof to a retractor mounted to a floor within a vehicle body adjacent the inboard side of a seat and is fixed at the other end thereof to a door sash at an area adjacent the rear and upper edge, so that when the door is opened, the seat belt will extend forwardly of the seat to allow easy ingress or egress of a passenger and, the passenger sits on the seat and then closes the door, the seat belt is automatically fastened around the passenger.

Another group of systems, which is also known, employs an electrical or pneumatic means for displacing a guide, through which a portion of a seat belt passes, forwardly along a roof side of a vehicle body, in response to opening movement of a vehicle door.

A problem with the former group is that the safety belt cannot fasten the passenger with a sufficient force when the door is closed owing to the fact that the end of the seat belt is fixed to the rear edge of an upper sash of the door. With this arrangement, furthermore, a sufficient amount of forward displacement of the seat belt away from the passenger cannot be obtained when the door is opened.

The latter group has a problem too that the construction is complicated and adds to price hike.

SUMMARY OF THE INVENTION

According to the present invention, a control arm is provided which can slide forwardly along a roof side of a vehicle body and is pivoted to a door for swinging movement in response to movement of the door about a hinge axis thereof. A seat belt extends from a retractor forwardly of a seat. A portion of the seat belt is slidably carried by the control arm. When the door is closed, the control arm extends along the roof side to allow the seat belt to fasten around the seat. As the door is opened, opening movement of the door will cause the control arm to swing, thus extending the seat belt forwardly of the seat.

An object of the present invention, therefore, is to provide a seat belt system which is less expensive and more reliable, and which employs a simple mechanism for automatically fastening a seat belt around a passenger in a seat.

DESCRIPTION OF THE PREFERRED EMBODIMENTS

Figure 1:
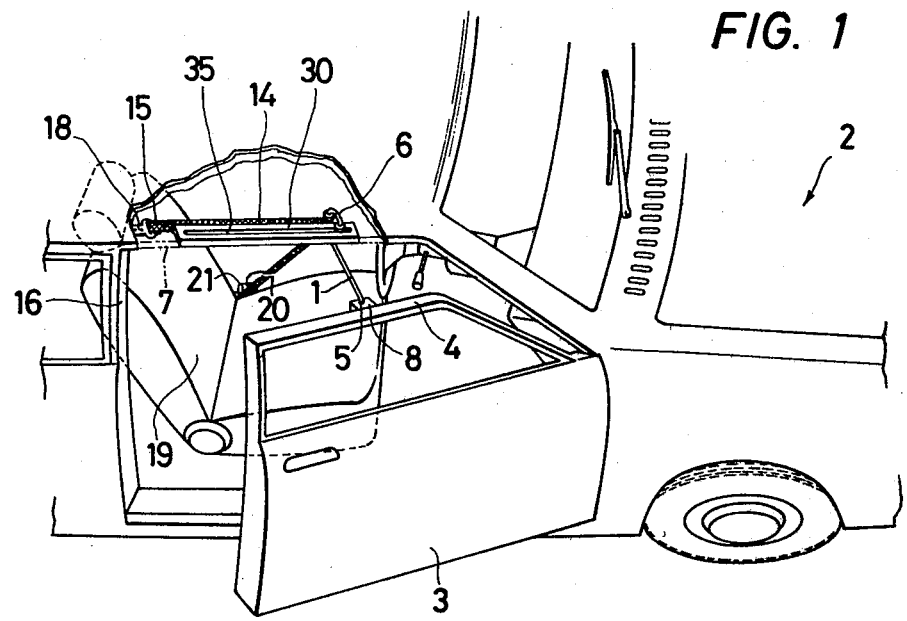
FIG. 1 is a fragmentary perspective view, partly broken away, of an automobile incorporating a first preferred embodiment of a seat belt system according to the present invention, showing a position of the safety belt with the vehicle door open.

Referring to FIG. 1, a perspective view of a part of an automobile incorporating a seat belt system of the present invention, an example is shown wherein the present system is applied to a driver seat of a passenger car. In this figure, a control arm 1 is shown which has one end pivotally mounted to an intermediate portion of an upper door sash 4 of a door 3 and this arm has an other end displaceable forwardly or rearwardly within a slide member 30 fixed to a roof side rail 7 at forward and rearward edges thereof.

Figure 2A:
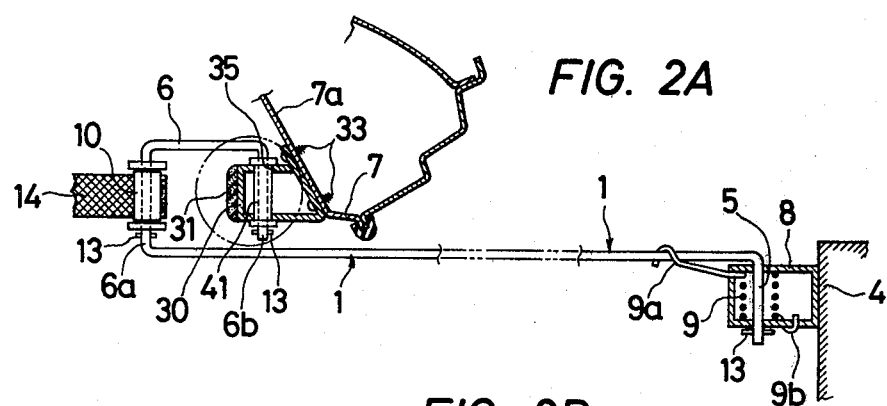
FIG. 2A is an enlarged view of the encircled part of FIG. 2.
Figure 2B:
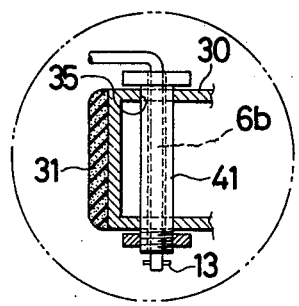
FIG. 2 is a sectional view showing the position of a control arm with the vehicle door open.

Specifically explaining in connection with FIG. 2, one end 5 of the control arm 1 bent downwardly is rotatably supported by a box-like bracket 8 fixedly mounted to the upper door sash 14 at a generally center portion on the inner side thereof for rotation within a generally horizontal plane, and a coil spring 9 mounted within the bracket 8 urges the control arm counter-clockwise, viewing in FIG. 1, with one and opposite ends 9a and 9b engaging in the control arm 1 and the bracket 8, respectively.

At the other end portion 6, the control arm 1 is bent to form an inversed U, thus forming a pair of vertical axles 6a and 6b, as shown in FIG. 2, and a pulley 10, around which a seat belt 14 to be described hereinafter passes, is rotatably supported by the inboard axle 6a and a guide roller 40 is rotatably supported by the outboard axle 6b which is displaceable within a slide member 30. The guide roller 40 can roll along a slot 35 with which the slide member 30 is formed forwardly or rearwardly with respect to the vehicle body, the slide member fixed to the inside surface 7a of the roof side rail 7 by means of screws 33.

The reference numeral 31 indicates a padding adhered to a surface 30 of the slide member 30 and the reference numeral 13 a lock pin.

Turning to the seat belt 14 for the purpose of restraining a vehicle passenger, its one end 15 is fixed by an anchor 18 to a rearward portion of the roof side rail 7, i.e., an upper portion of a center pillar 16, the seat belt extends forwardly of a seat (driver's seat) 19, and its other end 30 leads to a conventional retractor 21 of the known construction fixedly mounted to a floor adjacent the inboard side of the seat, for example, a tunnel portion of a floor panel, or fixedly mounted to the inboard side of the seat.

The seat belt 14 passes through the other end portion of the control arm 1 by having a portion of its passing around the pulley 10.

Figure 3A:
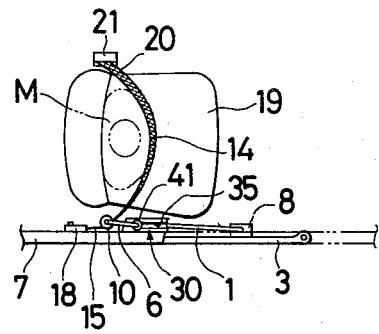
FIG. 3A is a schematic plan view of the right side of the automobile showing a position of the sefety belt with the vehicle door closed.
Figure 5A:
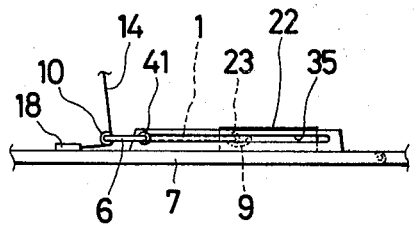
FIG. 5A is a plan view of the right side of an automobile incorporating the second embodiment with the vehicle door closed.

According to the seat belt system of the above construction, when the door 3 is closed, the control arm 1 extends along the roof side rail 7, as shown in FIG. 3A, under the action of a spring 9 so that the seat belt 14 will fasten around to restrain the passenger M with tension being applied by the retractor 21 without any interference by the control arm because its end 14 is disposed near the anchor 19.

Figure 3B:
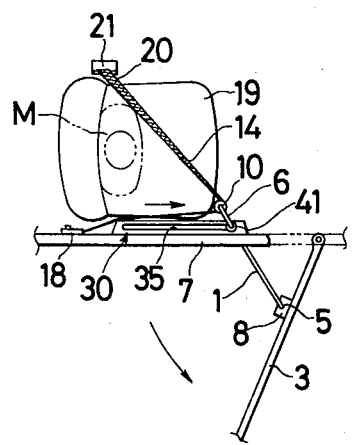
FIG. 3B is a schematic plan view of the right side of the automobile showing the position, the same position as in FIG. 1, with the vehicle door open.
Figure 5B:
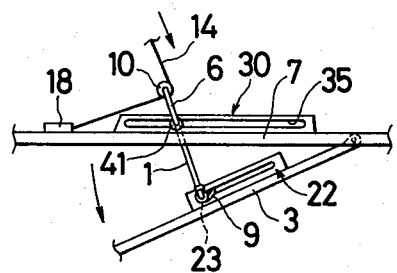
FIG. 5B is a plan view of the automobile of FIG. 5A with the vehicle door opened to a predetermined degree.
Figure 4:
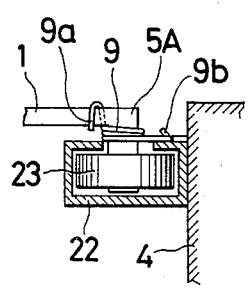
FIG. 4 is a fragmentary sectional view of a second preferred embodiment showing a constructional feature which differs from the first preferred embodiment.
Figure 5C:
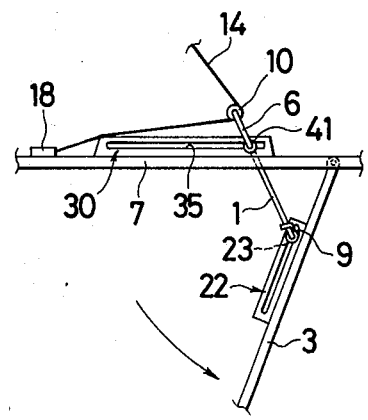
FIG. 5C is a plan view of the automobile of FIG. 5A with the vehicle door opened to the fully opening degree.

As the door 3 is opened from the closed position, the guide roller 41 rolls along the slide member 30 to displace the end 6 forwardly of the vehicle body, as shown in FIG. 3B, because the end 5 of the control arm 1 is displaced with the door 3 outwardly of the roof side rail 7. As a result, the seat belt 14 is pulled forwardly by the pulley 10, wherein the pulley 10 rolls on the seat belt in a direction from the one to the other ends thereof and the necessary amount of belt is drawn from the retractor 21, so that the seat belt extends forwardly to take an oblique triangle, as viewed in plane. This condition is illustrated also in FIG. 1 and permits easy ingress or egress of the passenger.

If the door 3 is closed again, due to the action of the spring 9 and the tension applied to the seat belt 14, the condition as shown in FIG. 3A will result, enabling the seat belt to fasten around the passenger.

Referring to FIG. 4 and FIGS. 5(A)–(C), showing another embodiment, a guide bracket 22 of an appropriate length and having a C-shaped cross-section is mounted along the inside face of the door sash 4; and an end 5A of the control arm 1 can displace along the door sash 4 and pivot to the latter also due to the fact that a roller 23 is rotatably supported by this end of the control arm to roll within the guide bracket 22. The construction of the other end portion of this control arm 1 and that of the seat belt 14 are substantially the same as the counterportions of the preceding embodiment. The both ends of the guide bracket 22 are so constructed as to prevent disengagement of the roller 23 therefrom.

With this construction of this embodiment, the guide roller 40 rolls along the roof side rail 7 forwardly in response to the opening movement of the door 3, drawing the seat belt 14 in a direction indicated by the adjacent arrow, further opening movement of the door 3 beyond a predetermined opening degree will cause the guide roller 23 to roll within the guide bracket 22, causing further displacement of the guide roller and the end 6 in the forward direction, and as a result the substantially the same amount of seat belt can be drawn. An advantage with this embodiment is in that because the end of the control arm 1 can displace along the bracket, the length of the control arm 1 can be shortened by an amount corresponding to the amount of the displacement to draw the same amount of the seat belt.

What is claimed is:

1. In an automobile including a seat, a forwardly hinged door including an upper sash portion and a roof side adjacent the upper sash portion a seat belt system comprising:

a control arm mounted to the upper sash portion of the door for swinging movement and having a portion slidably mounted to slide along the roof side longitudinally of the automobile in response to movement of the door about its hinge axis;

a spring arranged to urge said control arm to swing rearward;

a retractor mounted within the automobile;

said spring being coupled with said control arm to effect said rearward swinging of said control arm, said spring being separate from said retractor and disposed spacedly therefrom, said spring being mounted at said upper sash portion of the door and said retractor being mounted other than at said upper sash portion;

a safety seat belt extending from said retractor and having a portion slidably carried by said control arm such that when the door is closed, said control arm extends along the roof side to allow said retractor to fasten said seat belt around the seat and as the door is opened, the opening movement of the door about its hinge causing said control arm to swing, thus extending said seat belt forwardly of the seat.

2. A seat belt system as claimed in claim 1, further comprising a guide secured to the upper sash portion and a slide member secured to the roof side, one end of said control arm being received in said guide for slidable movement along said guide and the other end thereof being received in said slide member for slidable movement along said slide member.

3. A seat belt system as claimed in claim 1, further including means, mounted at said upper sash portion generally in a central region thereof, for rotatably supporting said control arm on said upper sash portion, said spring being mounted within said supporting means.

4. A seat belt system as claimed in claim 3, wherein said supporting means is a box-like bracket.

* * * * *